(12) United States Patent
Harer et al.

(10) Patent No.: US 9,514,267 B2
(45) Date of Patent: Dec. 6, 2016

(54) SYSTEM ON CHIP I/O CONNECTIVITY VERIFICATION IN PRESENCE OF LOW POWER DESIGN CONSIDERATIONS

(71) Applicant: Synopsys, Inc., Mountain View, CA (US)

(72) Inventors: Kevin Michael Harer, Cornelius, OR (US); Praveen Tiwari, Cupertino, CA (US)

(73) Assignee: Synopsys, Inc., Mountain View, CA (US)

(*) Notice: Subject to any disclaimer, the term of this patent is extended or adjusted under 35 U.S.C. 154(b) by 87 days.

(21) Appl. No.: 14/542,895

(22) Filed: Nov. 17, 2014

(65) Prior Publication Data

US 2016/0140281 A1 May 19, 2016

(51) Int. Cl.
*G06F 17/50* (2006.01)

(52) U.S. Cl.
CPC ....... *G06F 17/5081* (2013.01); *G06F 17/5022* (2013.01); *G06F 17/5068* (2013.01)

(58) Field of Classification Search
CPC .............. G06F 17/5081; G06F 17/5022; G06F 17/5068
See application file for complete search history.

(56) References Cited

U.S. PATENT DOCUMENTS

| | | | | |
|---|---|---|---|---|
| 7,610,571 B2* | 10/2009 | Chen | .................... | G06F 17/5022 716/109 |
| 7,747,971 B1* | 6/2010 | Chopra | ................. | G06F 17/504 716/136 |
| 7,770,142 B1* | 8/2010 | Shmayovitsh | ...... | G06F 17/5036 716/109 |
| 7,958,475 B2* | 6/2011 | Khan | ................ | G01R 31/31721 716/109 |
| 8,386,980 B2* | 2/2013 | Murray | ................. | G06F 17/505 716/119 |

(Continued)

OTHER PUBLICATIONS

Mbarek et al.; "Using unified power format standard concepts for power-aware design and verification of systems-on-chip at transaction level"; IET Circuits, Devices & Systems; Jun. 7, 2012; vol. 6, Iss.5; pp. 287-296.*

(Continued)

*Primary Examiner* — Naum B Levin
(74) *Attorney, Agent, or Firm* — Fenwick & West LLP (57) ABSTRACT

Formal verification of connectivity of a circuit, for example, a circuit representing a system on chip I/O ring is performed with low power considerations. The formal verification determines whether the connectivity of a circuit remains valid when low power design specification is introduced. The system receives assertions representing connectivity of the circuit. The system receives low power design specification for a circuit that describes power states of power domains of the circuit. The system generates combinational constraints representing valid power states of power domains of the circuit. The system performs formal verification based on the assertions representing the connectivity of the circuit and the combinational constraints representing the power states of power domains of the circuit. The result of the formal verification is used to determine whether the connectivity of the circuit is valid in view of the low power design specification.

21 Claims, 10 Drawing Sheets

(56) References Cited

U.S. PATENT DOCUMENTS

| | | | |
|---|---|---|---|
| 8,412,967 B2 * | 4/2013 | De Martini | G06F 1/24 713/320 |
| 8,448,112 B1 * | 5/2013 | Kashai | G06F 17/5036 716/104 |
| 8,572,541 B2 | 10/2013 | Singh et al. | |
| 8,601,426 B1 * | 12/2013 | Du | G06F 17/5081 716/133 |
| 8,726,224 B1 * | 5/2014 | Giangarra | G06F 17/5036 716/132 |
| 8,954,904 B1 * | 2/2015 | Loh | G06F 17/505 716/103 |
| 9,002,694 B2 * | 4/2015 | Feng | G06F 17/5036 703/18 |
| 9,189,578 B1 | 11/2015 | Giangarra et al. | |
| 9,268,901 B1 * | 2/2016 | Sood | G06F 17/5081 |
| 2009/0089725 A1 | 4/2009 | Khan | |
| 2011/0320991 A1 | 12/2011 | Hsu et al. | |
| 2013/0305207 A1 | 11/2013 | Hsieh et al. | |

OTHER PUBLICATIONS

Bailey, S. et al., "Low Power Design and Verification Techniques," White Paper, Mentor Graphics, Sep. 13, 2007, 14 pages.

Panda, P.R., "Power-Efficient System Design: Chapter 1," 2010, 10 pages.

Panda, P.R., "Power-Efficient System Design: Chapter 2," 2010, 30 pages.

"Unified Power Format (UPF) Standard," Version 1.0, Feb. 22, 2007, 104 pages.

* cited by examiner

SYSTEM ON CHIP I/O CONNECTIVITY VERIFICATION IN PRESENCE OF LOW POWER DESIGN CONSIDERATIONS

FIELD OF THE INVENTION

This invention relates generally to formal verification of circuits and more specifically to formal verification of system on chip I/O (input/output) connectivity in presence of low power design considerations.

BACKGROUND

Formal verification techniques verify whether the design intent of a specification for a circuit design is preserved in a particular implementation of the circuit. The design intent for a circuit design is specified using various assertions. The formal verification techniques verify whether these assertions hold true. Conventional formal verification techniques do not consider certain types of input specification, for example, low power specification. Low power design may be specified using unified power format (UPF).

In low power design, each portion of the circuit belongs to a power domain. Certain power domains can switch off during certain modes of the circuit. For example, certain portions of a circuit are on during normal operations of a device but are off in a low power mode. If a portion of a circuit is off during a mode, the outputs of that portion of the circuit carry an undefined signal. If this undefined signal reaches as input to other portions of the circuit, the signals propagating through these portions of the circuit also become undefined. As a result, power on/off combinations based on various low power modes can cause connectivity analysis results to be invalid. Conventional formal verification techniques do not take into account the low power design specification. Therefore, the results of formal verification of the circuit design may be erroneous. As a result, conventional formal verification techniques used in design of circuits that include low power specification are inadequate and may not provide accurate results.

SUMMARY

The above and other issues are addressed by a computer-implemented method, computer system, and computer program product for performing system on chip I/O connectivity verification under low power considerations. A system receives a request to perform formal verification based on a set of assertions representing system on chip I/O connectivity of a circuit. The system receives low power design specification for the circuit. The low power design specification describes power states for power domains of the circuit. The system generates combinational constraints based on the low power design specification. The combinational constraints represent power states of power domains of the circuit as defined in the low power design specification. The system performs formal verification of the system on chip I/O connectivity based on the set of assertions representing the connectivity and the combinational constraints based on the low power design. The system determines whether the circuit has valid connectivity in view of the low power design specification based on the results of the formal verification.

In an embodiment, the system modifies the circuit based on the low power specification before performing the formal verification. The system introduces circuit design elements, for example, isolation cells based on the low power design specification and performs formal verification based on the modified circuit.

The features and advantages described in this summary and the following detailed description are not all-inclusive. Many additional features and advantages will be apparent to one of ordinary skill in the art in view of the drawings, specification, and claims hereof.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. Alternative embodiments of the structures and methods illustrated herein may be employed without departing from the principles described herein.

DETAILED DESCRIPTION

Embodiments of the invention perform formal verification of connectivity in a circuit. The embodiments consider low power design specification in the formal verification process to ensure that connectivity of the circuit is valid after low power design specification is introduced. Typically, low power design specification is analyzed late during a design cycle of a circuit and formal verification performed early in the design cycle. However, embodiments process the low power design specification early in the design cycle along with the formal verification process to ensure that the formal verification results are valid in view of the low power design specification.

The techniques disclosed herein can be used for connectivity verification of system on chip input/output ring. The number of input/output (I/O) pads of a chip is limited. In comparison the number of ports in the core of the chip is much larger. The I/O pads of the chip are shared across multiple ports by using multiplexors. The selector inputs of the multiplexors correspond to different modes. Accordingly, each mode causes the I/O pads to be connected to a particular set of ports in the chip. Embodiments use formal verification techniques to verify system on chip (SOC) I/O ring connectivity. The following section describes various stages in the EDA (electronic design automation) flow.

Overview of EDA Design Flow

Figure 1:
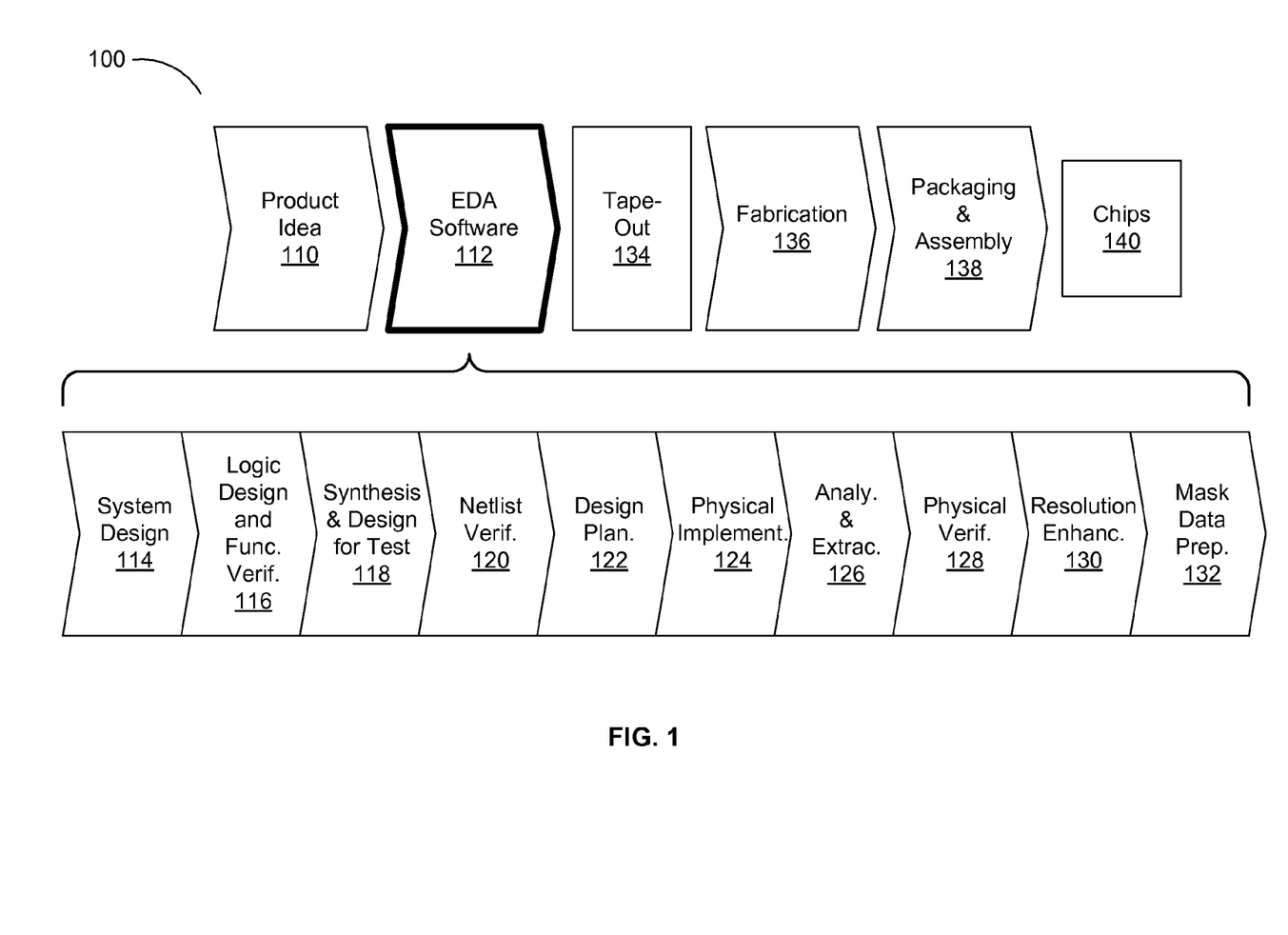
FIG. 1 is a flowchart illustrating various operations in the design and fabrication of an integrated circuit.

FIG. 1 is a flowchart 100 illustrating the various operations in the design and fabrication of an integrated circuit. This process starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

Figure 10:
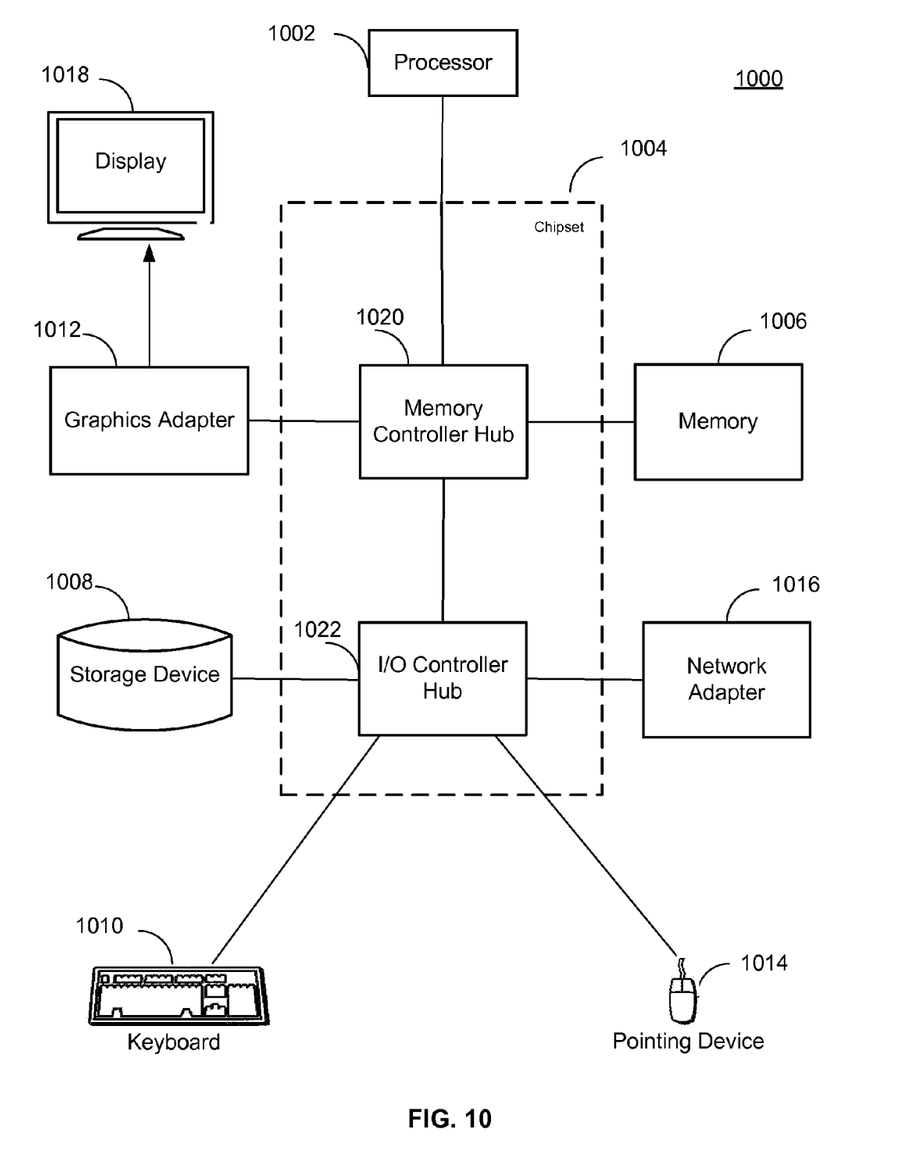
FIG. 10 is a high-level block diagram illustrating an example of a computer for use in compression of scenarios, in accordance with an embodiment.

The EDA software 112 may be implemented in one or more computing devices such as the computer 1000 of FIG. 10. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus® AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Formal verification may be performed at the stage of logic design and functional verification 116. Low power design specification is typically processed during stages synthesis and design for test 118 or netlist verification 120. Embodiments process low power design specification early, as part of the formal verification process.

System Architecture

Figure 2:
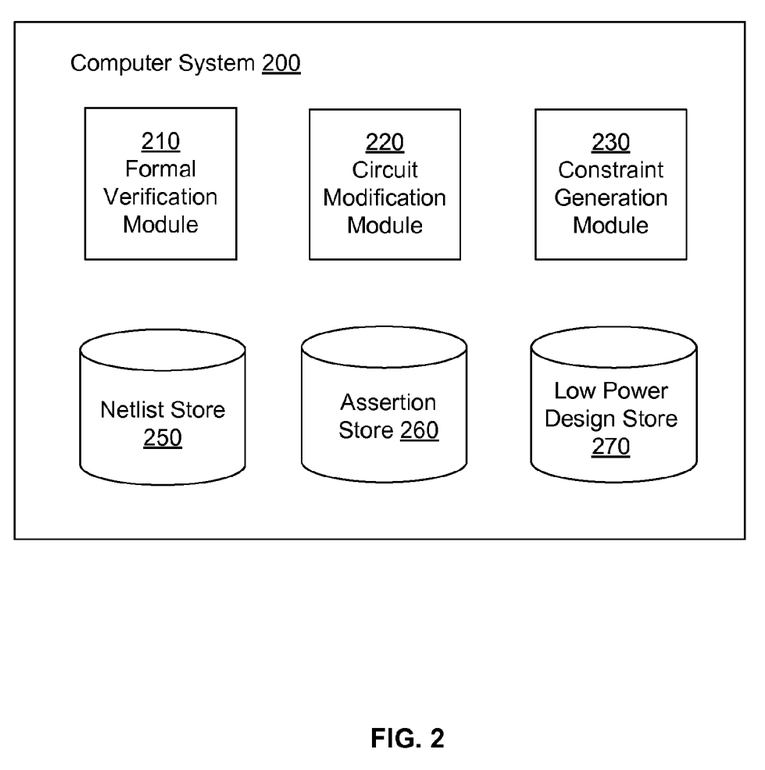
FIG. 2 illustrates the system architecture for formal verification of system on chip I/O connectivity with low power design considerations, according to an embodiment.

FIG. 2 illustrates an embodiment of the system architecture for automatic verification and generation of merged modes based on individual modes. The computer architecture illustrated in FIG. 2 comprises a computer system 200 comprising a formal verification module 210, a circuit modification module 220, a constraint generation module 230, a netlist store 250, a an assertion store 260, and a low power design store 270.

In one embodiment, the computer system 200 can be a conventional computer system executing, for example, a Microsoft Windows-compatible operating system (OS), Apple OS X, and/or a Linux distribution. Some embodiments of the computer system 200 have different and/or other modules than the ones described herein, and the functions can be distributed among the modules in a different manner than described here. For example, the computer system 200 might also include modules for receiving electronic circuit information via a network or modules for transmitting results via the network.

The formal verification module 210 performs formal verification of assertions related to a circuit. The input to the formal verification module 210 includes a set of assertions and constraints. The formal verification module 210 determines whether the assertions and constraints are valid. If the formal verification module 210 determines that the assertions and constraints are not valid, the formal verification module 210 generates a counter example where the assertions and constraints fail. In an embodiment, the assertions represent connectivity of a circuit, for example, connectivity of I/O ring of a system on chip.

The circuit modification module 220 modifies a given circuit based on low power design specification. The circuit modification module 220 may introduce design elements in the circuit based on the low power design specification. For example, the circuit modification module 220 may include isolation cells between components belonging to two different power domains specified in the low power specification.

The constraint generation module 230 generates a set of combinational constraints based on low power specification of a circuit. The set of combinational constraints generated represents power states of power domains specified in the low power design specification. The constraint generation module 230 provides the generated combinational constraints as input to the formal verification module 210, to perform formal verification with low power considerations.

The netlist store 210 stores the information describing the netlists for the electronic circuits. The information stored in the netlist includes various components of the circuit and their interconnections. In an embodiment, the netlist of a circuit may be represented as a graph comprising nodes representing components and edges representing interconnections between the components.

Figure 4:
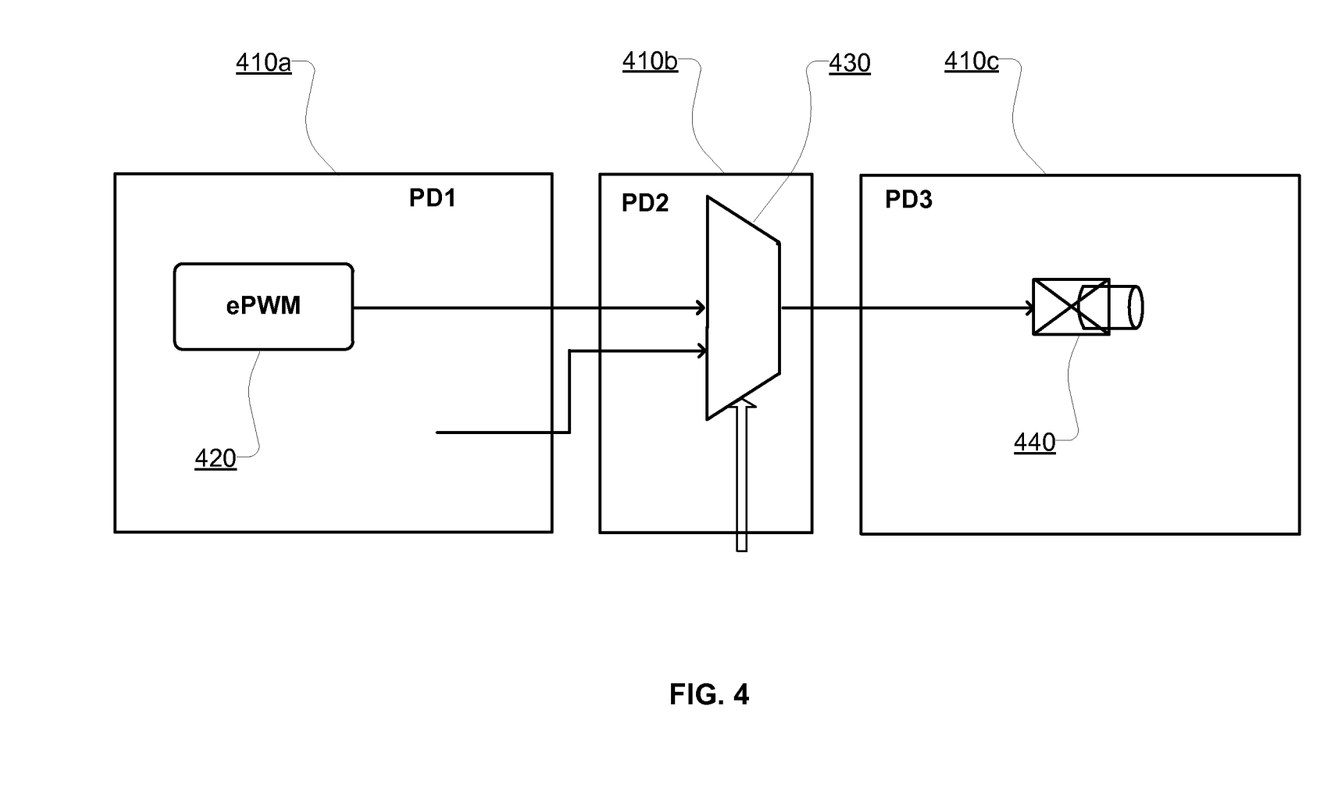
FIG. 4 shows an example of circuit illustrating assertions based on connectivity of the circuit provided as input for formal verification, according to an embodiment.

The assertion store 260 stores assertions representing circuits. An assertion may represent connectivity of a circuit. In an embodiment, the assertions are represented as expressions, each expression specifying connectivity between components of a circuit. FIG. 4 describes an example circuit with assertions representing the connectivity of the circuit. The assertions are provided to the formal verification module 210 for performing formal verification of connectivity of a circuit.

The low power design store 270 stores the low power design specification of circuits. In an embodiment, the low power design specification is specified using the unified power format (UPF.) The low power design specification describes various power domains of a circuit, valid power states of the power domains of the circuit, and also circuit design elements for introducing in the circuit based on low power considerations, for example, isolation cells. The low power design specification stored in low power design store 270 is provided as input to the constraint generation module 230 to generate combinational constraints based on the low power specification. The constraint generation module 230 provides the generated combinational constraints as input to the formal verification module 210.

Formal Verification

Figure 3:
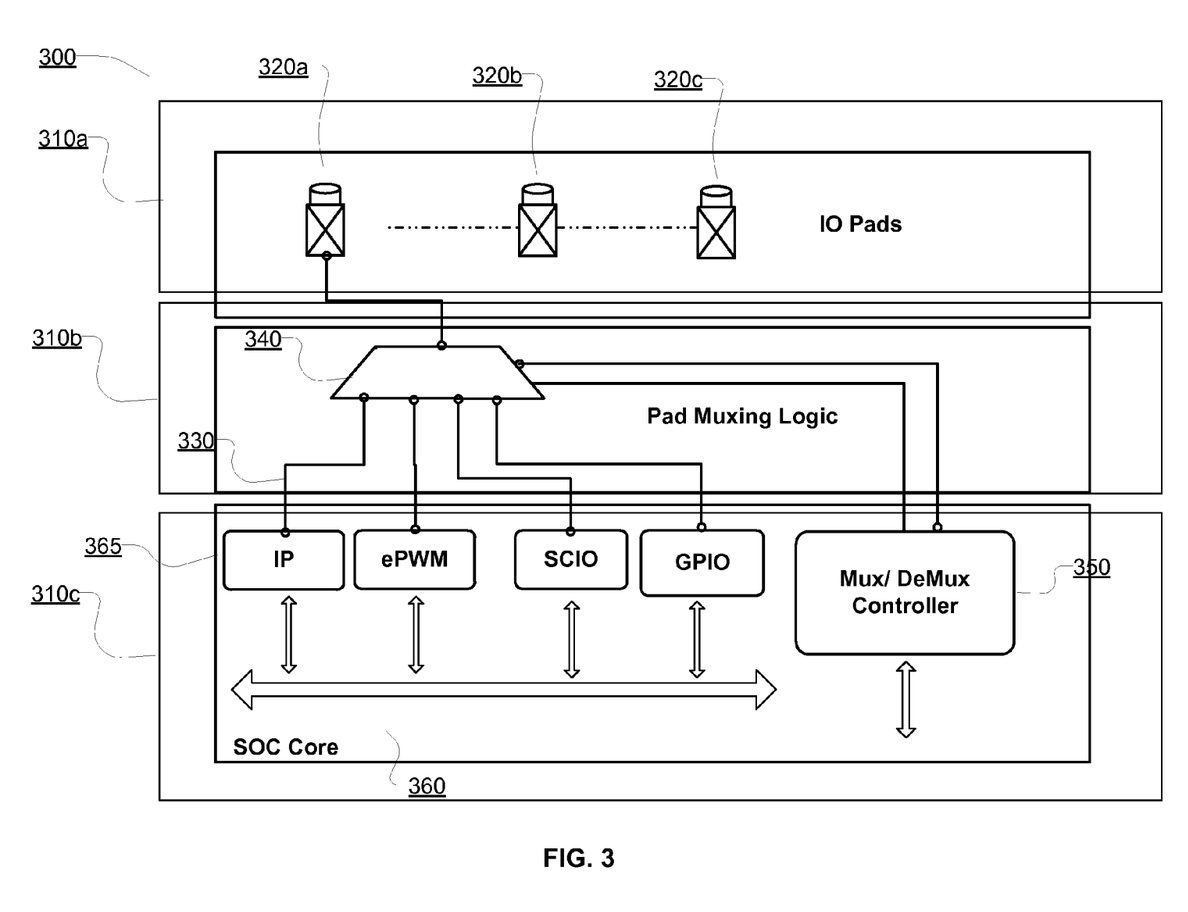
FIG. 3 shows an example circuit illustrating a system on chip I/O ring with low power specification for use as input for formal verification, according to an embodiment.

FIG. 3 shows an example circuit with low power specification for use as input for formal verification, according to an embodiment. Figure (FIG. 3 and the other figures use like reference numerals to identify like elements. A letter after a reference numeral, such as "310a," indicates that the text refers specifically to the element having that particular reference numeral. A reference numeral in the text without a following letter, such as "310," refers to any or all of the elements in the figures bearing that reference numeral (e.g. "310" in the text refers to reference numerals "310a" and/or "310b" in the figures).

FIG. 3 shows an example of a circuit 300 for use as input for formal verification according to an embodiment. The circuit shown in FIG. 3 represents the input/output ring of a system on chip. Typically, the number of ports 330 in the circuit 300 is significantly larger than the number of pins 320 (also referred to as input/output pads) at the boundary of the chip. The circuit 300 uses a multiplexor/demultiplexor 340 controlled by a multiplexor/demultiplexor controller 350 to be able to connect the ports of the circuit with the pins.

The multiplexor/demultiplexor connects a pin with a particular port based on the logic of the multiplexor/demultiplexor controller 350. In general, if a circuit is working in a particular mode (e.g., scan mode, test mode, normal mode, reset mode, and so on), the set of pins is connected to a set of ports. In another mode, the set of pins may be connected to a different set of ports. The logic for connecting the pins to ports is also referred to as SOC (system on chip) I/O (input/output) ring. The number of possible connections that can be created using the multiplexor/demultiplexor can be very large (exponential in number of inputs of the multiplexor). For example, for a 10 input multiplexor, the number of possible connections is $2^{10}$. The large number of possible connections makes it difficult to verify connectivity of the circuit.

Furthermore, the design of the circuit 300 may include low power specification. The low power specification may specify one or more power domains 310a, 310b, 310c. A power domain specifies a set of components of the circuit and associated criteria determining when the power for the set of components is on/off. For example, the circuitry associated with a screen may get turned on/off based on a particular criteria, other circuitry may be turned off/on based on a different criteria.

The circuit design may specify the power domains and criteria associated with the power domains using a UPF specification. The UPF specification for the circuit may specify valid combinations of power modes for the chip. If an input of a component C1 in one domain is driven by a component C2 from another domain that is off, the component C1 gets undefined input. Therefore, UPF specification often includes isolation devices to protect components from receiving invalid inputs. Embodiments of the invention formally verify whether such undefined values are reaching components that are functioning in modes that are on.

Embodiments disclosed herein are used to perform formal verification of SOC I/O ring connectivity between pins and the SOC core 360. As an example, formal verification of a circuit may be performed to verify that a component 365 in FIG. 3 is connected to I/O pad 320a via the multiplexor 340. However if the low power design is not considered during the formal verification, the formal verification results may be incorrect. For example, based on the low power specification it is possible that the power domain 310b is off in certain mode. In that mode, the result of the formal verification is incorrect because the multiplexor is in a power domain 310b that is off and accordingly the value provided to the I/O pad 320a is undefined. Conventionally, the low power specification is processed very late in the design cycle after formal verification is already performed. Accordingly, conventional techniques realize very late that the results of formal verification are incorrect in view of low power specification. Embodiments consider low power specification early in the design stags, i.e., while performing formal verification to ensure that the formal verification results are consistent with the low power specification.

FIG. 4 shows an example of circuit illustrating assertions based on connectivity of the circuit provided as input for formal verification, according to an embodiment. FIG. 4 shows three power domains 410a (PD1), 410b (PD2), and 410c (PD3). The component 420 (shown as ePWM in the circuit) provides input to the component 440 (i.e., an I/O pad) via the multiplexor 430. The formal verification module 210 processes assertions representing connectivity of circuits as described below.

An example of a formal property representing connectivity of portions of the circuit shown in FIG. 4 and specified using a formal verification language is as follows:

"assert_EPWM:assert property (mode==4'b1101|→ePWM.data[0]==pad.in)" (1)

The term "assert_EPWM" is a name of the property. The command "assert" is a directive for the system to prove the property identified by the string provided as input to command "property." The string "mode==4'b1101" specifies a mode by providing the enable signal for the multiplexor 430. The string "ePWM.Data[0]==pad.in" specifies that the output of component 420 (i.e., ePWM) should be connected to the input of the component 440, i.e., the I/O pad. The entire string specifies the property indicating that for the given mode (specified by string "mode==4'b1101") the output of ePWM (specified by ePWM.data[0]) should be connected to the input of the I/O pad (specified as pad.in.)

If a conventional formal verification tool determines that the above property is valid, the formal verification result may be correct only for certain power domain combinations. For example, the formal verification result would be correct when all three power domains PD1, PD2, and PD3 are on. However the formal verification result is incorrect if PD1 and PD2 are on but PD2 is off. This is so because the multiplexor is off when power domain PD2 is off and accordingly, the output of ePWM components does not reach the I/O pad. Similarly, the formal verification result is incorrect if power domains PD2 and PD3 are on but power domain PD1 is off. This is so because although the multiplexor is working, the ePWM component is not functioning because the power domain PD1 is off. Accordingly, the output of the component ePWM is undefined and the multiplexor is providing the undefined value as input to the I/O pad. Accordingly, for both these power domain combinations, the formal verification result would be incorrect. However, embodiments of the invention identify these failures during formal verification.

Figure 5:
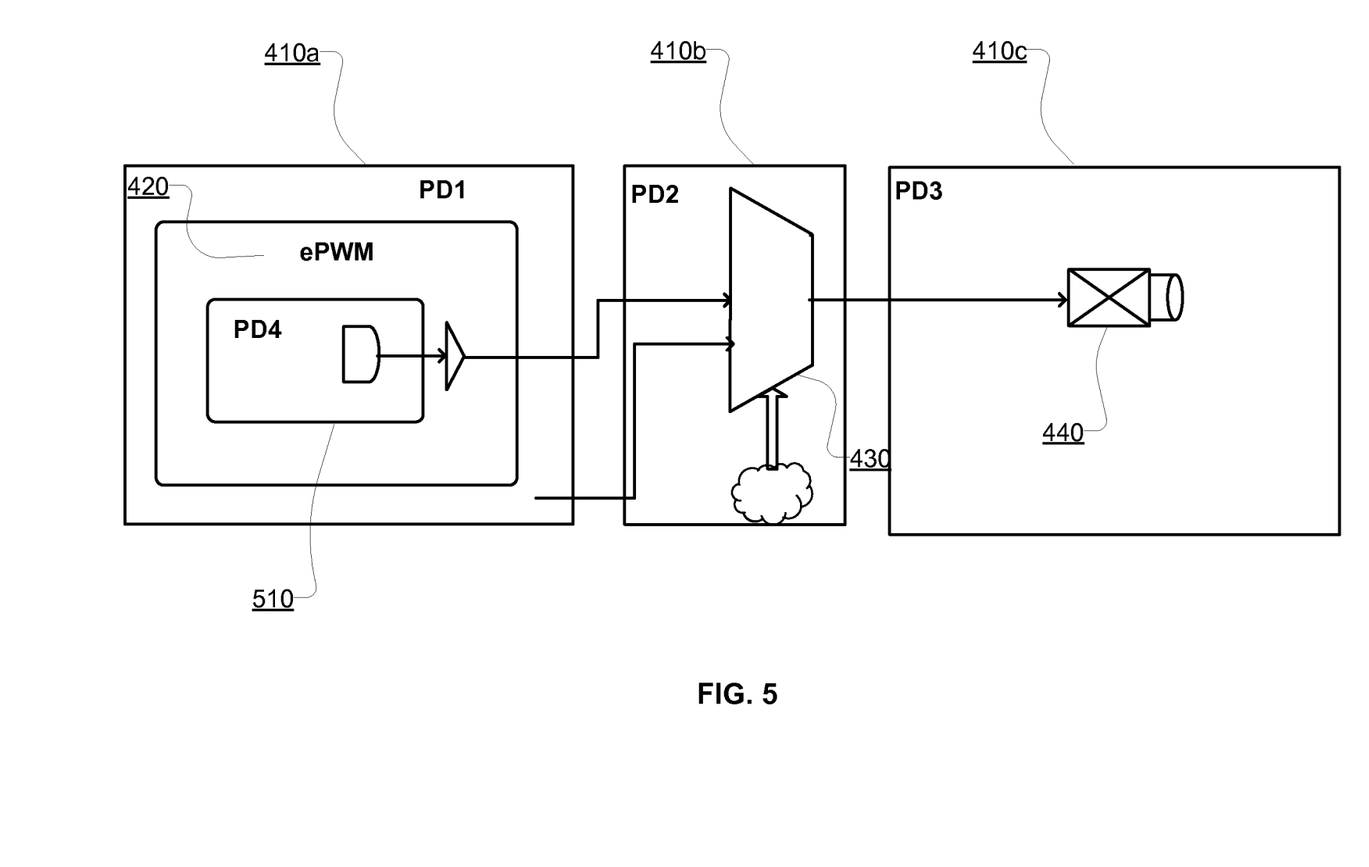
FIG. 5 shows another example of a circuit with nested power domains provided as input for formal verification, according to an embodiment.

FIG. 5 shows another example of a circuit with nested power domains provided as input for formal verification, according to an embodiment. The circuit shown in FIG. 5 is similar to the circuit shown in FIG. 4, except for introduction of a fourth power domain 510 (labelled PD4) associated with the component 420 (ePWM). This example illustrates that the power domain specification can be complex with embedded power domains. If the above property (1) is verified for the circuit shown in FIG. 5, in addition to failures possible due to scenarios described above, the formal verification result may be incorrect when PD4 is off. However, embodiments of the invention identify such failures during formal verification.

Figure 6:
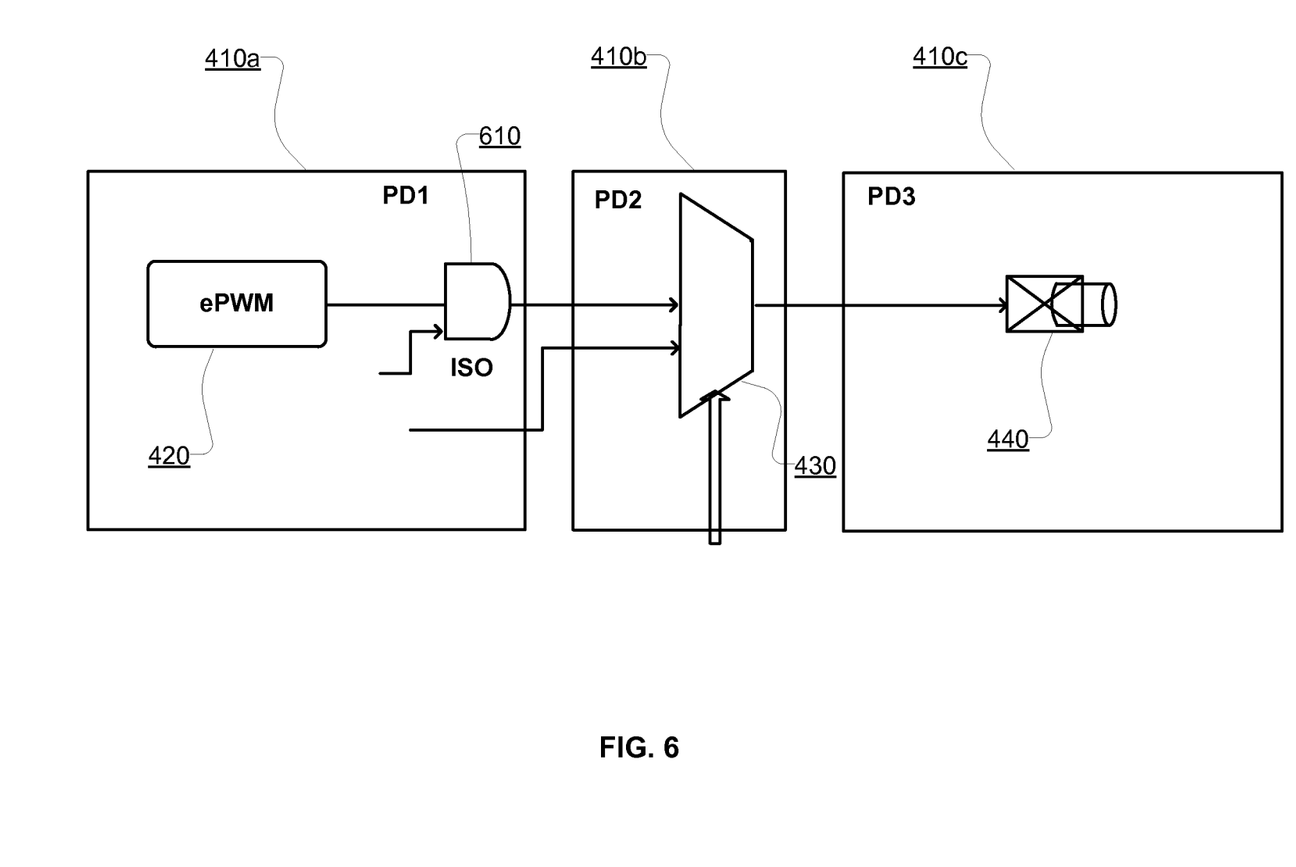
FIG. 6 shows another example of a circuit including an isolation cell provided as input for formal verification, according to an embodiment.

FIG. 6 shows another example of a circuit including an isolation cell provided as input for formal verification, according to an embodiment. In addition to the components and power domains shown in FIG. 4, FIG. 6 shows an AND gate 610 added as an isolation cell between output of ePWM component 420 and the I/O pad 440. The AND gate 610 ensures that the output of the AND gate 610 is false when power domain PD1 is off to prevent undefined values from reaching the I/O pad in. Accordingly, when power domain PD1 is off, the output of the AND gate 610 is false and the false logical value is provided as input to the I/O pad 440. A conventional tool verifying connectivity of circuits in view of power domain specification would indicate that the connectivity of the circuit shown in FIG. 6 is correct. However, the logical result presented at the I/O pad 440 is incorrect since the input to the I/O pad 440 is not based on the output of component ePWM. However, embodiments of the invention flag such issues where there are logical or functional connectivity issues.

Overall Process of Formal Verification with Low Power Design Consideration

Figure 7:
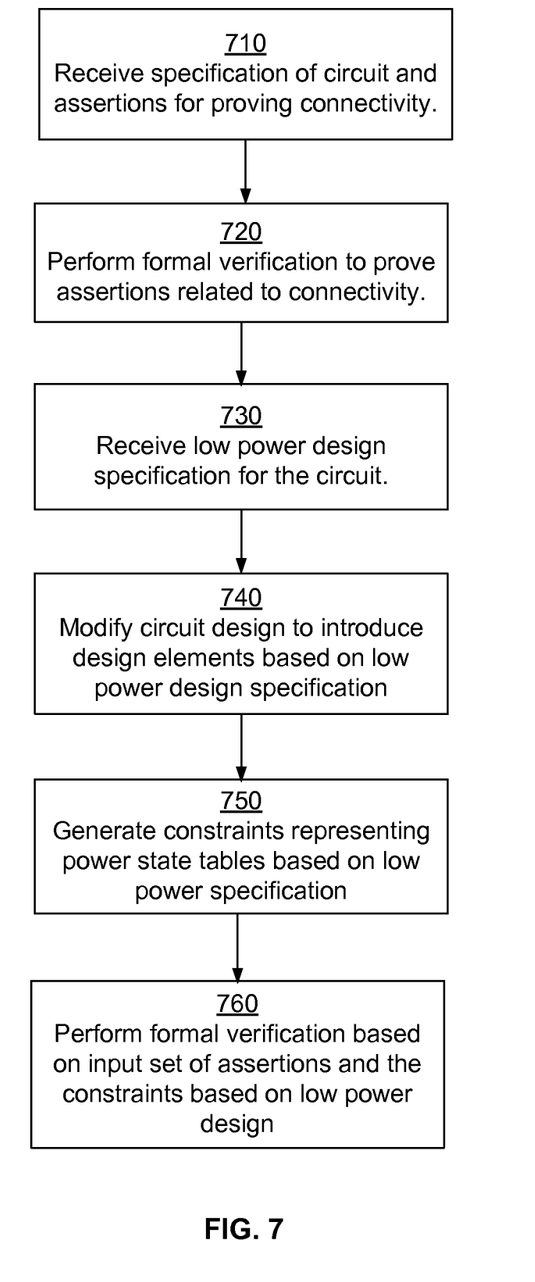
FIG. 7 is a flowchart illustrating the process for performing formal verification of a circuit with low power design considerations, according to an embodiment.

FIG. 7 is a flowchart illustrating the process for performing formal verification of a circuit with low power design considerations, according to an embodiment. The formal verification module 210 receives 710 a description of a circuit along with assertions for proving the connectivity of the circuit. The description of the circuit may be stored in the netlist store 250 and the assertions may be stored in the assertion store 260. The formal verification module 210 performs 720 formal verification based on the assertions representing connectivity of the circuit. If the assertions representing connectivity are not determined to be true, the formal verification module 210 provides the results to a user allowing the user to make modifications to the circuit to fix the connectivity of the circuit. If the assertions representing connectivity determined to be true, the formal verification module 210 proceeds performing formal verification with low power considerations.

The formal verification module 210 receives 730 low power design specification for the circuit. The low power design specification may be stored in the low power design store 270. In an embodiment, the low power design is specified using UPF format. The circuit modification module 220 modifies 740 the circuit design if necessary based on the low power design specification. The circuit modification module 220 may introduce design elements, for example, isolation cells based on low power design specification. For example, the circuit modification module 220 places isolation cells between components from different power domains to ensure that undefined signal from a component in a power domain that is switched off is not provided as input to components in a power domain that is on.

The constraint generation module 230 generates 750 combinational constraints representing power states specified in the low power design specification. The formal verification module 210 performs formal verification 760 based on the input set of assertions and the combinational constraints based on low power design. If the formal verification 760 determines that the circuit connectivity is valid given the set of assertions and the constraints based on the low power design, the computer system 200 determines that the circuit has valid connectivity given the low power design specification. If the formal verification 760 generates a counter example, indicating that there are issues with the circuit connectivity given the set of assertions and the combinational constraints based on the low power design, the computer system 200 provides information to the user indicating that the low power design specification causes failures in the connectivity.

Figure 8A:
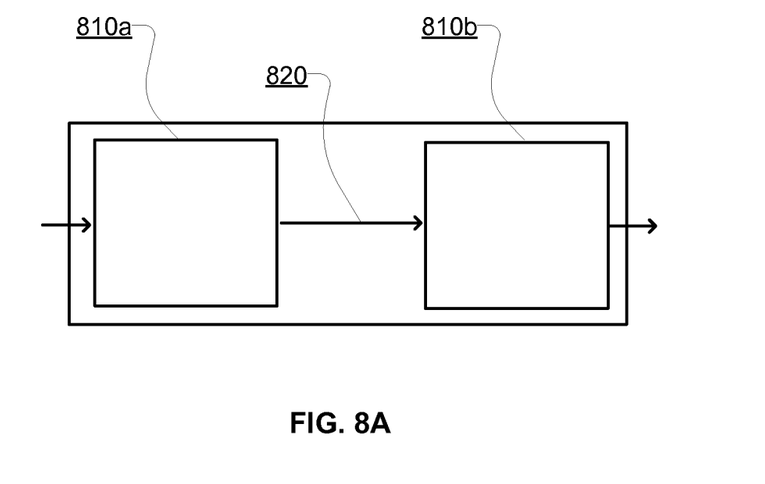
FIGS. 8A-8B show an example of a circuit illustrating modification of a circuit design based on low power specification, according to an embodiment.
Figure 8B:
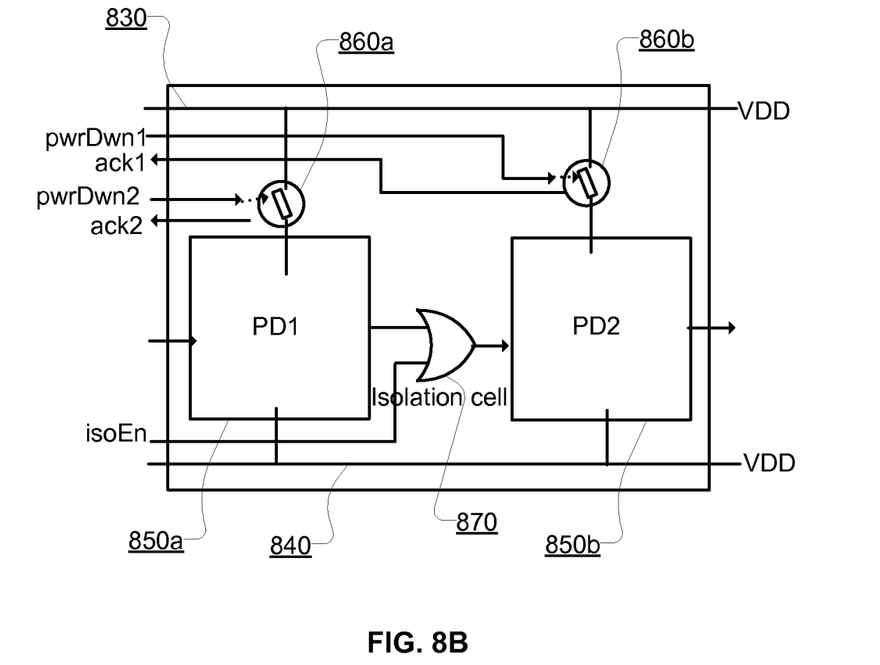

FIGS. 8A-8B show an example of a circuit illustrating modification 740 of a circuit design based on low power specification, according to an embodiment. A circuit is divided into sets of components (or circuit elements) associated with power domains. FIG. 8A shows two sets of components 810a and 810b. Each set of components 810 may be associated with a power domain. The sets of components may be connected to each other, for example, via nets 820.

FIG. 8B show an example circuit for illustrating generation of combinational constraints based on low power design specification, according to an embodiment. The circuit modification module 220 modifies 740 the input circuit by adding circuit elements based on the low power design specification. The low power specification associated with a circuit specifies power domains associated with the sets of components 810.

The low power design specification may specify a power domain in the circuit by specifying a "create power domain" command, for example, "create_power_domain PD1." The low power design specification may specify supply ports, for example, using commands "create_supply_port VDD" and "create_supply_port VSS." The circuit modification module 220 creates a supply port 830 (identified as VDD) and a supply port 840 (identified as VSS) based on these commands.

The low power design specification may specify power switches connecting a supply port for the chip with supply ports for different power domains. For example, the low power design specification may include a command "create_power_switch p1_sw -domain PD1 -input_supply_port {in VDD} -output_supply_port {out VDDS_p1} -control port {p0_sd pwrDwn2} -ack_port {p0_ack ack2}." Based on this command, the circuit modification module 220 introduces the switch element 860a in the circuit. As specified by the string "-input_supply_port {in VDD} -output-_supply_port {out VDDS_p1}" of the command, the circuit modification module 220 connects the switch 860a between the input supply port VDD (i.e., 830) and the output supply port VDDS_p1 of the power domain 850a (not shown in FIG. 8.)

The circuit modification module 220 identifies pwrDwn1 as the input for turning the switch 860a on/off based on the portion of the specification that specifies "-control port {p0_sd pwrDwn2}." The circuit modification module 220 identifies ack1 as the acknowledge signal from the switch 860a based on the portion of the specification that specifies -ack_port {p0_ack ack2}." The ack2 signal indicates whether the pwrDwn2 successfully changed the state of the switch 860a. Similarly, the circuit modification module 220 creates the switch 860b based on a similar command specified in the low power design specification.

The low power design specification may include commands to specify isolation cells between power domains. For example, the low power design specification may include a command "set_isolation iso_out -domain PD1 -applies_to outputs." The circuit modification module 220 modifies the input circuit to add isolation cell 870 to isolate the outputs of domain PD1. The isolation cell 870 prevents the outputs of components in the power domain PD1 providing an undefined value as input to components in power domain PD2.

The low power design specification may include a command "set_isolation_control iso_out -domain PD1 -isolation_signal isoEn -location parent." The circuit modification module 220 defines the control input iso_en of the isolation cell based on this command. The isolation signal defines when the isolation cell is activated to control the output of a components from power domain PD1.

Figure 9:
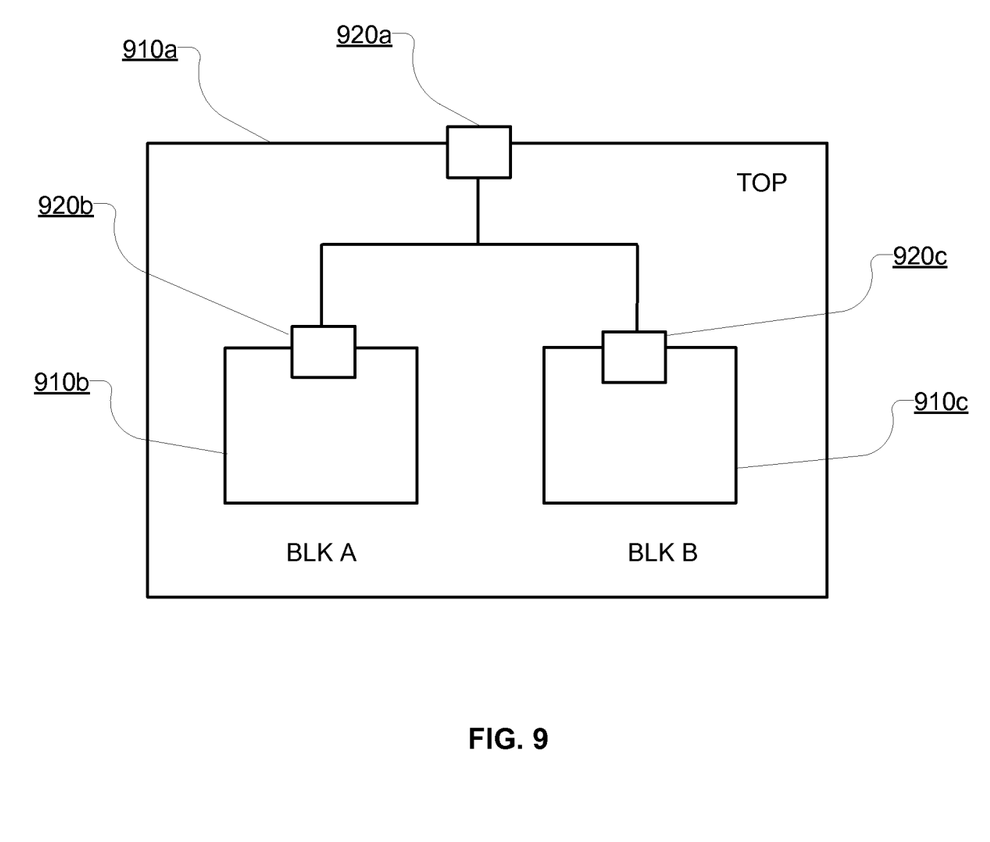
FIG. 9 show an example circuit for illustrating generation of combinational constraints based on low power design specification, according to an embodiment.

The constraint generation module 230 generates 750 combinational constraints based on the low power design specification. The generated combinational constraints represent valid power states of power domains of the circuit as specified by the low power design specification. In an embodiment, the constraint generation module 230 generates a constraint comprising a logical-and of individual constraints where each individual constraint represents valid power states of a power domain. Each individual constraint comprises a logical-or of state constraints where state constraint represents a valid power state of a power domain based on the low power design specification. A state constraint for a power domain comprises a logical-and of port constraints where each port constraint represents valid power states of ports of the power domain specified in the low power design specification. A power state of a port may be based on valid voltage levels for the port specified in the low power design specification FIG. 9 show an example circuit for illustrating generation 750 of combinational constraints based on low power design specification, according to an embodiment. FIG. 9 shows a block diagram of a circuit with three power domains, 910a (labelled TOP), 910b (labelled BLK A), and 910c (labelled BLK B). The low power design specification may specify valid voltage levels for each power domain.

Assume that three voltage levels are specified in the low power design specification for power domain 910a (i.e., power domain TOP). These are levels TOPV1_2 with voltage level 1.2, TOPV1_0 with voltage level 1.0, and TOPV0_8 with voltage level 0.8. Similarly, three voltage levels are specified for power domain 910b (i.e., power domain BLK A). These are levels BLKAV1_2 with voltage level 1.2, BLKAV0_8 with voltage level 0.8, and BLKAV0_6 with voltage level 0.6. Similarly, three voltage levels are specified for power domain 910c (i.e., power domain BLK B). These are levels BLKBV1_2 with voltage level 1.2, BLKBV1_0 with voltage level 1.0, and BLKBV0_8 with voltage level 0.8. The voltage levels for each power domain correspond to voltage levels for a port associated with the corresponding power domain.

The constraint generation module 230 represents each voltage level as a variable. For example, the constraint generation module 230 may use V1 to represent 1.2 volts, V2 to represent voltage level 1.0, V3 to represent voltage level 0.8 and V4 to represent voltage level 0.6. The constraint generation module 230 represents a power state of a port of a power domain based on valid voltage levels for the port.

For example, the constraint generation module 230 represents the power state of the port corresponding to the TOP power domain using V1, V2 and V3 (corresponding to the voltage levels 1.2, 1.0, and 0.8.) Similarly, the constraint generation module 230 represents the power state of the port corresponding to the BLK A power domain using V1, V3 and V4 (corresponding to the voltage levels 1.2, 0.8, and 0.6.) Similarly, the constraint generation module 230 represents the power state of the port corresponding to the BLK A power domain using V1, V2 and V3 (corresponding to the voltage levels 1.2, 1.0, and 0.8.)

In the example illustrated in FIG. 9, the low power specification specifies a single port for each power domain. If there are multiple ports corresponding to a power domain, the constraint generation module 230 generates a state expression for the power domain as a logical- and of the individual port constraints.

The constraint generation module 230 generates an expression representing the power state table for each power domain as a logical-or of state expressions corresponding to the power domain. For example, the individual expression representing the power state table for TOP power domain is (V1∥V2∥V3), the individual expression representing the power state table for BLK A power domain is (V1µV3∥V4), and the individual expression representing the power state table for BLK B power domain is (V1∥V2∥V3.)

The constraint generation module 230 generates a constraint representing the system power state table by combining the individual expressions corresponding to the power domains. The constraint generation module 230 generates a constraint representing the system power state table as a logical-and of individual constraints, each individual constraint representing valid power states of a power domain. For example, for the power domains shown in FIG. 9, the constraint generation module 230 generates the constraint representing the system power state table as $((V1\|V2\|V3)\ \&\&\ (V1\|V3\|V4)\ \&\&\ (V1\|V2\|V3))$.

The constraint generation module 230 provides the constraint representing the system power state table to the formal verification module. The formal verification module uses the constraint along with assertions representing connectivity of the circuit to perform formal verification in view of low power considerations. The result of the formal verification may be presented to a user.

Computer Architecture

FIG. 10 is a high-level block diagram illustrating an example computer 1000 that can be used for processing the steps of the processes described herein. The computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display 1018 is coupled to the graphics adapter 1012. A storage device 1008, keyboard 1010, pointing device 1014, and network adapter 1016 are coupled to the I/O controller hub 1022. Other embodiments of the computer 1000 have different architectures.

The storage device 1008 is a non-transitory computer-readable storage medium such as a hard drive, compact disk read-only memory (CD-ROM), DVD, or a solid-state memory device. The memory 1006 holds instructions and data used by the processor 1002. The pointing device 1014 is a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to one or more computer networks.

The computer 1000 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1008, loaded into the memory 1006, and executed by the processor 1002. The types of computers 1000 used can vary depending upon the embodiment and requirements. For example, a computer may lack displays, keyboards, and/or other devices shown in FIG. 10.

Alternative Embodiments

The embodiments disclosed herein can be used to connectivity verification of circuits in view of low power considerations. Although SOC I/O ring connectivity is presented as an example of a type of circuit for which the formal verification is performed, embodiments can be used for formal verification of any other type of circuit. Furthermore, the assertions used for formal verification are not limited to assertions specifying connectivity of the circuit but can be any other kind of assertions describing the circuit.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for formal verification of circuit in view of low power considerations. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for performing formal verification of a circuit in view of low power design specification, the method comprising:

receiving, by a computer processor, a request to perform formal verification of connectivity of a circuit representing an input/output ring of a system on chip, the circuit represented by a circuit design, the circuit comprising components and connections between components;

receiving, by the computer processor, low power design specification for the circuit, the low power design specification describing power states for one or more power domains of the circuit;

modifying, by the computer processor, the circuit design by introducing one or more isolation cells based on the low power design specification;

generating, by the computer processor, combinational constraints based on the low power design specification, the combinational constraints representing valid power states of power domains of the circuit based on the low power design specification;

receiving, by the computer processor, a set of assertions representing connectivity between components of the circuit, wherein a result of evaluation of an assertion is based on whether a component is connected to another component;

performing, by the computer processor, formal verification of the modified circuit design based on the set of assertions representing connectivity between components of the circuit and the combinational constraints based on low power design specification; and determining, by the computer processor, whether the circuit has valid connectivity in view of the low power design specification based on the result of the formal verification, the result of the formal verification based on values of the assertions representing connectivity between components of the circuit.

2. The computer-implemented method of claim 1, wherein a combinational constraint based on low power design specification comprises a logical-and of individual constraints, each individual constraint representing valid power states of a power domain specified in the low power design specification.

3. The computer-implemented method of claim 2, wherein an individual constraint comprises a logical-or of state constraints, each state constraint representing a valid power state of a power domain based on the low power design specification.

4. The computer-implemented method of claim 3, wherein a state constraint for a power domain comprises a logical-and of port constraints, each port constraint representing valid power states of ports of the power domain specified in the low power design specification.

5. The computer-implemented method of claim 4, wherein a power state of a port is based on valid voltage levels for the port specified in the low power design specification.

6. The computer-implemented method of claim 1, wherein the formal verification performed is formal verification with low power considerations, the method further comprising:
performing, by the computer processor, formal verification of the circuit design without considering low power design specification; and
wherein the formal verification with low power considerations is performed responsive to performing a successful formal verification without low power considerations.

7. The computer-implemented method of claim 1, wherein the circuit represents the input/output ring of a system on chip.

8. The computer-implemented method of claim 1, further comprising:
modifying, by the computer processor, the circuit design by introducing one or more design elements based on the low power design specification.

9. The computer-implemented method of claim 8, wherein the one or more design elements comprise design elements for isolation of circuit elements.

10. The computer-implemented method of claim 1, wherein the formal verification performed is formal verification with low power considerations, the method further comprising:
performing, by the computer processor, formal verification of the circuit design without considering low power design specification; and
wherein the formal verification with low power design considerations is performed responsive to performing a successful formal verification without considering low power design specification.

11. A computer-implemented method for performing formal verification of a circuit in view of low power design specification, the method comprising:
receiving, by a computer processor, a request to perform formal verification of connectivity of a circuit, the circuit represented by a circuit design, the circuit comprising components and connections between components;

receiving, by the computer processor, low power design specification for the circuit, the low power design specification describing power states for one or more power domains;

generating, by the computer processor, combinational constraints based on the low power design specification, the combinational constraints representing valid power states of power domains of the circuit based on the low power design specification;

receiving, by the computer processor, a set of assertions representing connectivity between components of the circuit, wherein a result of evaluation of an assertion is based on whether a component is connected to another component;

performing, by the computer processor, formal verification of the circuit design based on the set of assertions representing connectivity between components of the circuit and the combinational constraints based on low power design specification; and determining, by the computer processor, whether the circuit has valid connectivity in view of the low power design specification based on the result of the formal verification, the result of the formal verification based on values of the assertions representing connectivity between components of the circuit.

12. The computer-implemented method of claim 11, wherein a combinational constraint based on low power design specification comprises a logical expression based on individual constraints, each individual constraint representing valid power states of a power domain specified in the low power design specification.

13. The computer-implemented method of claim 12, wherein each individual constraint comprises a logical expression based on state constraints, each state constraint representing a valid power state of a power domain based on the low power design specification.

14. The computer-implemented method of claim 13, wherein a state constraint comprises a logical expression based on port constraints, each port constraint representing valid power states of ports of the power domain specified in the low power design specification.

15. The computer-implemented method of claim 14, wherein a power state of a port is based on valid voltage levels for the port specified in the low power design specification.

16. The computer-implemented method of claim 15, wherein a constraint based on the low power design specification comprises a logical-and of individual constraints, each individual constraint representing valid power states of a power domain specified in the low power design specification.

17. The computer-implemented method of claim 16, wherein each individual constraint comprises a logical-or of state constraints, each state constraint representing a valid power state of a power domain based on the low power design specification.

18. The computer-implemented method of claim 17, wherein a state constraint comprises a logical-and of port constraints, each port constraint representing valid power states of ports of the power domain specified in the low power design specification.

19. The computer-implemented method of claim 18, wherein a power state of a port is based on valid voltage levels for the port specified in the low power design specification.

20. A non-transitory computer readable storage medium comprising stored instructions, the stored instructions when executed by a computer processor, causing the computer processor to:
   receive, by the computer processor, a request to perform formal verification of connectivity of a circuit representing an input/output ring of a system on chip, the circuit represented by a circuit design, the circuit comprising components and connections between components;
   receive, by the computer processor, low power design specification for the circuit, the low power design specification describing power states for one or more power domains of the circuit;
   modify, by the computer processor, the circuit design by introducing one or more isolation cells based on the low power design specification;
   generate, by the computer processor, combinational constraints based on the low power design specification, the combinational constraints representing valid power states of power domains of the circuit based on the low power design specification;
   receive, by the computer processor, a set of assertions representing connectivity between components of the circuit, wherein a result of evaluation of an assertion is based on whether a component is connected to another component;
   perform, by the computer processor, formal verification of the modified circuit design based on the set of assertions representing connectivity between components of the circuit and the combinational constraints based on low power design specification; and
   determine, by the computer processor, whether the circuit has valid connectivity in view of the low power design specification based on the result of the formal verification, the result of the formal verification based on values of the assertions representing connectivity between components of the circuit.

21. A computer-implemented system for performing formal verification of circuits with low power considerations, the system comprising:
   a computer processor; and
   a non-transitory computer-readable storage medium comprising stored instructions, the stored instructions when executed by the computer processor, causing the computer processor to:
      receive a request to perform formal verification of connectivity of a circuit representing an input/output ring of a system on chip, the circuit represented by a circuit design, the circuit comprising components and connections between components;
      receive low power design specification for the circuit, the low power design specification describing power states for one or more power domains of the circuit;
      modify the circuit design by introducing one or more isolation cells based on the low power design specification;
      generate combinational constraints based on the low power design specification, the combinational constraints representing valid power states of power domains of the circuit based on the low power design specification;
      receive a set of assertions representing connectivity between components of the circuit, wherein a result of evaluation of an assertion is based on whether a component is connected to another component;
      perform formal verification of the modified circuit design based on the set of assertions representing connectivity between components of the circuit and the combinational constraints based on low power design specification; and
      determine whether the circuit has valid connectivity in view of the low power design specification based on the result of the formal verification, the result of the formal verification based on values of the assertions representing connectivity between components of the circuit.

* * * * *